(12) United States Patent  
Chin et al.

(10) Patent No.: US 9,125,182 B2
(45) Date of Patent: Sep. 1, 2015

(54) SYSTEM AND METHOD FOR DETERMINING ESTABLISHMENT CAUSES FOR EMERGENCY SESSIONS

(75) Inventors: Chen Ho Chin, Deerlijk (BE); Richard Charles Burbidge, Slough (GB)

(73) Assignee: BlackBerry Limited, Waterloo, Ontario (CA)

(*) Notice: Subject to any disclaimer, the term of this patent is extended or adjusted under 35 U.S.C. 154(b) by 510 days.

(21) Appl. No.: 13/499,644

(22) PCT Filed: Oct. 1, 2010

(86) PCT No.: PCT/IB2010/002607
§ 371 (c)(1),
(2), (4) Date: Jul. 12, 2012

(87) PCT Pub. No.: WO2011/039636
PCT Pub. Date: Apr. 7, 2011

(65) Prior Publication Data
US 2012/0269099 A1   Oct. 25, 2012

Related U.S. Application Data

(60) Provisional application No. 61/248,213, filed on Oct. 2, 2009.

(51) Int. Cl.
*H04L 12/28* (2006.01)
*H04W 76/02* (2009.01)
*H04W 4/22* (2009.01)
*H04W 76/00* (2009.01)

(52) U.S. Cl.
CPC .............. *H04W 76/022* (2013.01); *H04W 4/22* (2013.01); *H04W 76/007* (2013.01)

(58) Field of Classification Search
None
See application file for complete search history.

(56) References Cited

U.S. PATENT DOCUMENTS

| | | | |
|---|---|---|---|
| RE43,949 E * | 1/2013 | Park et al. | 455/452.2 |
| 8,606,285 B2 * | 12/2013 | Cave | 455/450 |
| 2005/0090224 A1 | 4/2005 | Dorsey et al. | |
| 2008/0261557 A1 | 10/2008 | Sim | |

(Continued)

FOREIGN PATENT DOCUMENTS

| | | |
|---|---|---|
| CN | 1853424 | 10/2006 |
| CN | 101466083 | 6/2009 |

(Continued)

OTHER PUBLICATIONS

CIPO, Office Action, Application No. 2,749,713, Jun. 16, 2014, 2 pgs.

(Continued)

*Primary Examiner* — Minh-Trang Nguyen
(74) *Attorney, Agent, or Firm* — Fish & Richardson P.C.

(57) ABSTRACT

A method for initiating a Packet Switched emergency call using a user equipment (UE) is presented. The UE includes a plurality of protocol layers. The plurality of protocol layers including an IMS sublayer, a non-access stratum (NAS) layer and an access stratum (AS) layer. The method includes generating an ATTACH REQUEST using the UE. The ATTACH REQUEST has an attach type. The method includes retrieving the attach type of the ATTACH REQUEST using the NAS layer of the UE, and generating an RRC CONNECTION REQUEST. The RRC CONNECTION REQUEST includes an RRC establishment cause based upon the attach type of the attach request.

8 Claims, 10 Drawing Sheets

(56) References Cited

U.S. PATENT DOCUMENTS

| | | | |
|---|---|---|---|
| 2010/0255808 | A1 | 10/2010 | Guo et al. |
| 2010/0265884 | A1 | 10/2010 | Vikberg |
| 2010/0297979 | A1* | 11/2010 | Watfa et al. ............... 455/404.1 |

FOREIGN PATENT DOCUMENTS

| | | |
|---|---|---|
| CN | 101500213 | 8/2009 |
| WO | 2008084316 | 7/2008 |
| WO | 2009082936 | 7/2009 |
| WO | 2009/117588 | 9/2009 |
| WO | 2011/039636 | 7/2011 |

OTHER PUBLICATIONS

IP Australia, Notice of Acceptance, Application No. 2010302349, Jul. 2, 2014, 2 pgs.
JPO, Notice of Reasons for Rejection, Application No. 2011-545601, Jan. 29 2013, 4 pgs.
USPTO, Office Action, U.S. Appl. No. 12/688,578, Feb. 21, 2013, 10 pgs.
China IPO, Office Action, Application No. 201080012049.9, Feb. 8, 2014, 3 pgs.
Hong Kong IPD, Gazette and Register Entry of Publication, Application No. 13101639.0, Jun. 7, 2013, 4 pgs.
JPO, Notice of Reasons for Rejection, Application No. 2012-531517, Jun. 14, 2013, 4 pgs.
3GPP TS 24.301 V9.0.0, Technical Specification Group Core Network and Terminals, Non-Access Stratum (NAS) Protocol for Evolved Packet System (EPS), Stage 3 (Release 9), Sep. 28, 2009, pp. 65, 66, 164-166, 264, 265.
3GPP TS 36.331 V9.0.0, Technical Specification Group Radio Access Network, Evolved Universal Terrestrial Radio Access (E-UTRA) Radio Resource Control (RRC), Protocol Specification (Release 9), Sep. 29, 2009, pp. 97, 98.
3GPP TSG CT WG1 Meeting #59, Vodafone, Including Call Type "Emergency Calls," Jun. 28, 2009, C1-092349, 2 pgs.
EPO, Communication Pursuant to Rules 161(1) and 162 EPC, Application No. 10777096.8, May 9, 2012, 2 pgs.
PCT, Search Report, Application No. PCT/CA2010/000060, Mar. 29, 2010, 3 pgs.
PCT, Written Opinion, Application No. PCT/CA2010/000060, Mar. 29, 2010, 4 pgs.
PCT, Search Report, Application No. PCT/IB2010/002607, Mar. 23, 2011, 6 pgs.
PCT, International Preliminary Report on Patentability and Written Opinion, Application No. PCT/IB2010/002607, Apr. 12, 2012, 11 pgs.
3GPP, TS 23.167, V9.2.0., Technical Specification Group Services and System Aspects; IP Multimedia Subsystem Emergency Sessions, Release 9, Sep. 28, 2009, pp. 1-38.
3GPP, TR 23.869, V9.0.0, Support for Internet Protocol based IP Multimedia Subsystem Emergency Calls over General Packet Radio Service and Evolved Packet Service, Release 9, Mar. 13, 2009, pp. 1-35.
3GPP, TS 24.008, V8.4.0, Technical Group Core Network and Terminals, Mobile radio interface Layer 3 specification, Core network protocols, Stage 3, Release 8, Dec. 2008, 574 pgs.
3GPP, TS 24.301,V9.1.0, Technical Specification Group Core Network and Terminals; Non-Access-Stratum protocol for Evolved Packet System, Stage 3, Release 9, Sep. 1, 2009, pp. 1-8.
3GPP, TS 36.331, V8.4.0, Technical Specification Group Radio Access Network, Evolved Universal Terrestrial Radio Access Radio Resource Control, Protocol specification, Release 8, Dec. 2008, 200 pgs.
Ericsson et al, "Verification of UE setting of the RRC Establishment Cause", 3GPP Draft, R5-093155, Verification of UE Setting of RRC Establishment Cause (Discussion), Jun. 23, 2009, 5 pgs.
Huawei et al, "RRC establishment cause for Emergency Service", 3GPP Draft, (C1-094752), Oct. 12, 2009, 4 pgs.
USPTO, Restriction Office Action, U.S. Appl. No. 12/688,578, Mar. 13, 2012, 6 pgs.
USPTO, Office Action, U.S. Appl. No. 12/688,578, May 30, 2012, 15 pgs.
USPTO, Office Action, U.S. Appl. No. 12/688,578, Sep. 19, 2012, 11 pgs.
CIPO, Office Action, Application No. 2,749,713, Sep. 27, 2013, 2 pgs.
IP Australia, Office Action, Application No. 2010302349, Sep. 20, 2013, 3 pgs.
IP India, Patent Application Publication, Application No. 3229/CHENP/2012 A, Jul. 26, 2013, 1 pg.
KIPO, Notice of Allowance, Application No. 10-2011-7018882, Aug. 26, 2013, 3 pgs.
SIPO, First Office Action, Application No. 201080012049.9, Aug. 27, 2013, 4 pgs.
USPTO, Notice of Allowance, U.S. Appl. No. 12/688,578, Sep. 9, 2013, 8 pgs.
KIPO, Office Action, Application No. 10-2011-7018882, Mar. 25, 2013, 7 pgs.
USPTO, Advisory Action, U.S. Appl. No. 12/688,578, Apr. 23, 2013, 3 pgs.
3GPP TS 23.203 v 8.4.0, Technical Specification Group Core Network and Terminals; Non-Access-Stratum (NAS) protocol for Evolved Packet System (EPS); Stage 3 (Release 9), Dec. 1, 2008, 111 pgs.
3GPP TS 24.301 v 8.0.0, Technical Specification Group Core Network and Terminals; Non-Access-Stratum (NAS) protocol for Evolved Packet System (EPS); Stage 3 (Release 8), Dec. 1, 2008, 221 pgs.
CIPO, Office Action, Application No. 2,776,248, Nov. 26, 2013, 4 pgs.
KIPO, Office Action, Application No. 10-2012-7011270, Nov. 29, 2013, 4 pgs.
IP India, Patent Application Publication, Application No. 5395/CHENP/2011 A, Nov. 23, 2012, 1 pg.
KIPO, Notice of Allowance of Patent, Application No. 10-2012-701170, Oct. 14, 2014, 3 pgs.
SIPO, Notification of Completion of Formalities for Registration, Application No. 201080012049.9, Aug. 7, 2014, 2 pgs.
SIPO, Notification of Grant of Invention Patent, Application No. 201080012049.9, Aug. 7, 2014, 2 pgs.
CIPO, Office Action, Application No. 2,776,248, Jan. 13, 2015, 3 pgs.
Office Action, Application No. 201080054332.8, May 5, 2014, 7 pages.
Office Action, Application No. 201080054332.8, Jan. 20, 2015, 9 pages.

* cited by examiner

SYSTEM AND METHOD FOR DETERMINING ESTABLISHMENT CAUSES FOR EMERGENCY SESSIONS

CROSS-REFERENCE TO RELATED APPLICATIONS

This application claims the benefit of U.S. Provisional Application No. 61/248,213, filed Oct. 2, 2009, entitled "System and Method for Determining Establishment Causes for Emergency Sessions." The foregoing application is incorporated herein by reference in its entirety.

BACKGROUND

The present invention relates generally to determining establishment causes and more specifically to methods and systems for determining radio resource control (RRC) establishment causes using non-access stratum (NAS) procedures.

As used herein, the terms "user equipment" and "UE" can refer to wireless devices such as mobile telephones, personal digital assistants (PDAs), handheld or laptop computers, and similar devices or other user agents ("UAs") that have telecommunications capabilities. In some embodiments, a UE may refer to a mobile, wireless device. The term "UE" may also refer to devices that have similar capabilities but that are not generally transportable, such as desktop computers, set-top boxes, or network nodes.

In traditional wireless telecommunications systems, transmission equipment in a base station or other network node transmits signals throughout a geographical region known as a cell. As technology has evolved, more advanced equipment has been introduced that can provide services that were not possible previously. This advanced equipment might include, for example, an evolved universal terrestrial radio access network (EUTRAN) node B (eNB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). Additional improvements to LTE systems and equipment will eventually result in an LTE advanced (LTE-A) system. As used herein, the phrase "base station" will refer to any component, such as a traditional base station or an LTE or LTE-A base station (including eNBs), that can provide a UE with communication access to other components in a telecommunications system.

In mobile communication systems such as the E-UTRAN, a base station provides radio access to one or more UEs. The base station comprises a packet scheduler for dynamically scheduling downlink traffic data packet transmissions and allocating uplink traffic data packet transmission resources among all the UEs communicating with the base station. The functions of the scheduler include, among others, dividing the available air interface capacity between UEs, deciding the transport channel to be used for each UE's packet data transmissions, and monitoring packet allocation and system load. The scheduler dynamically allocates resources for Physical Downlink Shared Channel (PDSCH) and Physical Uplink Shared Channel (PUSCH) data transmissions, and sends scheduling information to the UEs through a control channel.

In existing telecommunications systems, the various signaling and protocol controllers that deliver telecommunication services are implemented in several protocol layers. Various peer to peer entities belonging to each of the layers signal and communicate with one another to enable and realize various functions so that services can be provided. Furthermore, each layer may provide one or more services to the upper layers. FIG. 1 is an illustration of some of the protocol layers found within existing telecommunications systems and illustrates a layered protocol that may be used for communications between a UE and a base station. As shown in FIG. 1, the network layers 12 reside above the access control layers 14. The network layers 12 and access control layers 14 may communicate with one another. Furthermore, because they reside above access control layers 14, the network control layers 12 receive services provided by the access control layers 14.

In a mobile communications network, the network layer signaling and protocol controllers of the UE and the core network (CN) communicate with one another through communications links established by the underlying radio access network (RAN) controllers. In UMTS and 3GPP terminologies, for example, the network layer between the UE and the CN is termed the Non Access Stratum (NAS). The radio access layer of the RAN is termed the Access Stratum (AS).

Because the underlying layers provide services to the upper layers, in the case of UMTS and 3GPP technologies, for example, the AS provides services to the NAS. One such service provided by the AS is to establish a signaling connection for the NAS of a UE such that the NAS of the UE can signal and communicate to an NAS of the core network. In long-term evolution/service architecture evolution (LTE/SAE) this service may be referred to as obtaining a signaling connection to access the enhanced packet core (EPC). To obtain the signaling connection, the AS executes an RRC connection establishment procedure. The procedure includes sending an RRC CONNECTION REQUEST message from the AS of the UE to the AS of the base station.

FIG. 2 is a flowchart showing an exemplary RRC establishment procedure executed by a UE in communication with an EUTRAN network. In a first step 20 the UE issues an RRCConnectionRequest message to the EUTRAN. In response, the EUTRAN sends an RRCConnectionSetup message to the UE in step 22 and receives an RRCConnectionSetupComplete message from the UE in step 24. A similar signaling procedure may be found in UMTS.

The RRC connection request procedure illustrated in FIG. 2 may be initiated by the RRC for its own needs, or the procedure can be initiated when the NAS transmits a request for a network connection to the AS such as to allow the NAS to communicate with the network. As such, the AS may request and establish resources on behalf of the NAS.

As part of the establishment of the signaling connection (e.g., as illustrated in FIG. 2), the RRC of the UE transmits to the AS of the base station an indication of the reason for requesting the connection. The reasons may include several values including emergency, highPriorityAccess, mt-Access, mo-Signalling, mo-Data, spare3, spare2, and spare1. Table 1 Illustrates example RRC signaling protocols including an establishment clause, and a definition of valid values for the establishment clause that may be provided by the NAS to the AS to request a signaling connection.

TABLE 1

-- ASN1 START
RRCConnectionRequest ::=    SEQUENCE {
    critical Extensions        CHOICE {
        rrcConnectionRequest-r8    RRCConnectionRequest-r8-
IEs,
        criticalExtensionsFuture    SEQUENCE { }

TABLE 1-continued

```
}
}
RRCConnectionRequest-r8-IEs ::=  SEQUENCE {
    ue-Identity                      InitialUE-Identity,
    establishmentCause               EstablishmentCause,
    spare                            BIT STRING (SIZE (1))
}
InitialUE-Identity ::=           CHOICE {
    s-TMSI                           S-TMSI,
    randomValue                      BIT STRING (SIZE (40))
}
EstablishmentCause ::=           ENUMERATED {
                                     emergency, highPriorityAccess, mt-
Access, mo-Signalling,
                                     mo-Data, spare3, spare2, spare1}
-- ASN1STOP
```

The establishment cause may indicate to the destination nodes (e.g., the base station/E-UTRAN and possibly the CN/EPC) the reason for such an establishment so that appropriate resources can be allocated for the signaling connection and subsequent usage of the signaling connection or the user plane connection. The establishment cause may also be used to discriminate/distinguish on charging tariffs/plans. In UMTS and EPS, the establishment cause that the RRC provides to the network in an RRC CONNECTION REQUEST message is taken from the inter-layer request from the NAS. As such, the RRC establishment cause that the AS (e.g., the RRC) uses in the RRC CONNECTION REQUEST is received from the NAS. Accordingly, it is the NAS that determines which establishment cause is to be used. For example, with reference to Table 1, "establishmentCause" may be used to provide the establishment cause for the RRC connection request as provided by the upper layers. With respect to the cause value names, highPriorityAccess relates to AC11 . . . AC15, 'mt' stands for 'Mobile Terminating' and 'mo' for 'Mobile Originating.

In the case of an emergency call, the NAS initiating such an emergency call on behalf of the upper layers (e.g., the call applications) may indicate that an emergency call is being placed. If so, the RRC Establishment Cause may be read by the base station and the CN, and, in response, the base station and CN may be configured to do their utmost to provide and maintain resources for the emergency call.

In some network configurations, however, the UE may be configured to implement an IMS layer for packet switched (PS) communications (including voice and data communications). For the IMS layer within the UE there is a peer IMS layer on the CN side. The IMS layer within the base station resides above the NAS layer. On the UE side, the IMS sublayer of the UE sits on par with applications. As such, the IMS layer (or sublayer) is above the NAS, and above the Mobility Management functions and the Session Management functions. FIG. 3a is an illustration of layering within a UE showing the IMS sublayer. As shown, the IMS sublayer 30 resides above both NAS layer 32 and AS layer 34. The IMS layer may be used to initiate PS voice communications. In some cases, a user may wish to initiate an emergency voice communication using services provided by the IMS layer.

Various communications networks, including public land mobile networks (PLMNs), may be required to support a user making an emergency call. Generally, however, those networks do not support emergency calls placed within the PS domain (e.g., using IMS). As such, existing systems may rely upon circuit switched (CS) domain services to provide the emergency call. Even though a user's UE may be configured to provide voice communication using IMS, in the special case of an emergency call, the UE does not use the PS domain services provided by IMS. Instead, the UE switches to the CS domain service to place the emergency call. When the UE is connected to a network that does not provide CS domain services, for example LTE/SAE, the UE may be configured to implement CS fallback (CSFB) to provide emergency calls (see, for example, TS 3GPP 23.272). In CSFB, instead of using the PS domain, the UE is moved back to a 2G or 3G system and uses the CS domain of the 2G/3G system to place the emergency call.

Going forward, however, the 3GPP PS domain may be required to support emergency calls. In that case, because the PS domain of 3GPP uses IMS as the layer to setup, control and manage a call or session or transaction, it will be the IMS layer that realizes the PS domain emergency call. As such, to setup an emergency session, the IMS sublayer may trigger the NAS layer with a request to establish access to the EPC core. In response, the NAS may then setup an NAS signaling connection and the AS may setup the RRC connection. In turn, the EPC, upon responding to the NAS request for network access, sets up the necessary bearers to support the requested service. In existing networks, however, although the IMS layer may indicate that the requested resources are for an emergency call there is no existing mechanism for such an indication to be passed through the NAS to the AS and, consequently, to the base station or network. As such, after receiving the RRC connection request, the AS of the base station may be incapable of determining that a particular requested signaling connection is for an IMS session that is requested for an emergency call.

In some cases, a UE operating in a limited service state may be used to initiate an emergency call. A limited service state may result when a UE has no subscriber identity module (SIM), when a user has not paid his phone bill and has a suspended account, or when a user travels to a foreign country and attempts to access mobile services on a network that does not have an appropriate roaming agreement with the user's home provider. In those circumstances, when the UE is powered up, the UE may attempt to enter a state in which the UE can support an emergency call, but is unable to provide additional services. As such, the UE may camp on an available cell of the PLMN in a limited service state for the sole purpose of providing emergency calls. If, in that limited service state, the UE is configured to initiate PS domain voice services (e.g., via IMS) for the purpose of providing an emergency call, in many network configurations the AS of the base station may be incapable of determining that a particular IMS session requested by the UE in the limited service state is for an emergency call.

As such, it is difficult for a base station to determine that an RRC connection request received from a UE will ultimately be used for an IMS emergency call. If the base station cannot determine that the request is for an IMS emergency call, the base station is incapable of quickly establishing the emergency session by, for example, gracefully releasing lesser priority resources if no radio resources are available on the base station. These problems are exacerbated in network configurations implemented using a network sharing configuration wherein a RAN, base transceiver station (BTS) or base station is effectively shared between two or more core networks or PLMNs.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
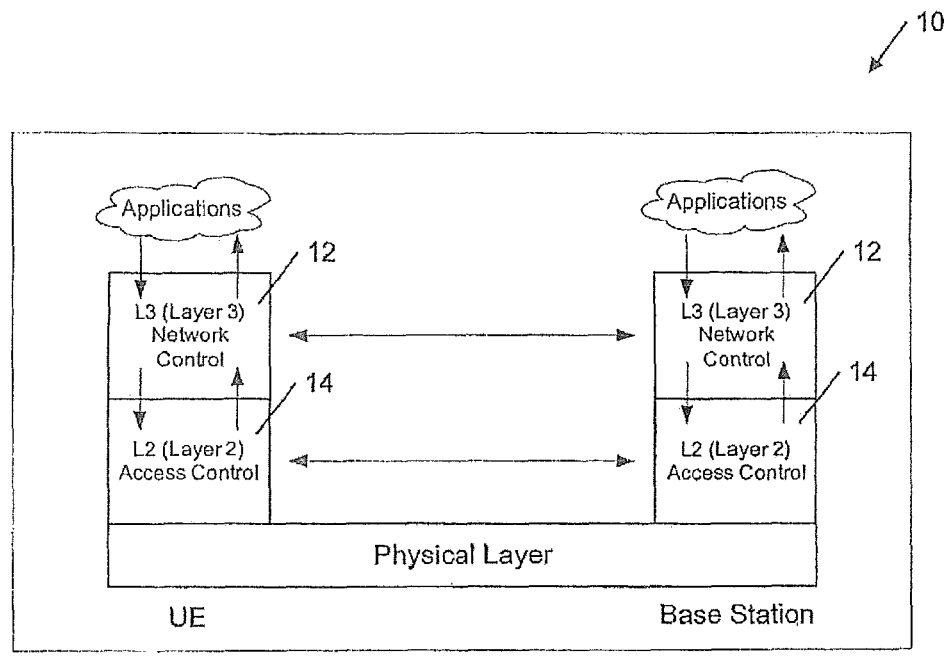
FIG. 1 is an illustration of some of the protocol layers found within existing telecommunications systems and illustrates a layered protocol that may be used for communications between a user equipment (UE) and a base station.
Figure 2:
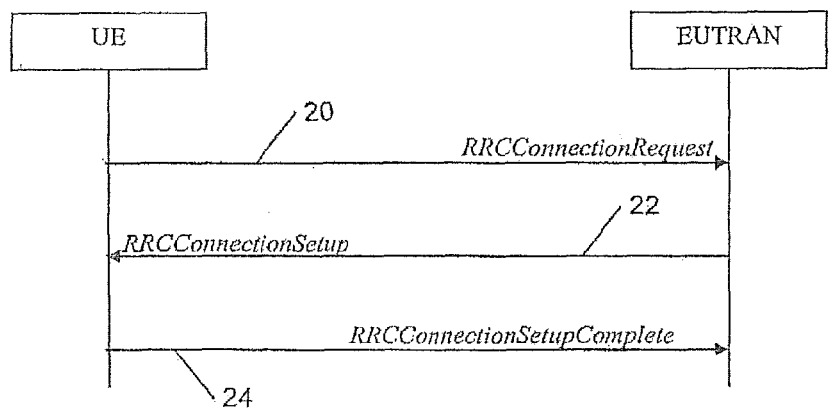
FIG. 2 is a message sequence flowchart showing an exemplary radio resource control (RRC) establishment procedure executed by a UE in communication with an evolved universal terrestrial radio access network (EUTRAN) network.

The present invention relates generally to determining establishment causes and more specifically to methods and systems for determining radio resource control (RRC) establishment causes using non-access stratum (NAS) procedures.

To this end, some embodiments include a method for initiating a Packet Switched emergency call using a user equipment (UE). The UE includes a plurality of protocol layers. The plurality of protocol layers including an IMS sublayer, a non-access stratum (NAS) layer and an access stratum (AS) layer. The method includes generating an ATTACH REQUEST using the UE. The ATTACH REQUEST has an attach type. The method includes retrieving the attach type of the ATTACH REQUEST using the NAS layer of the UE, and generating an RRC CONNECTION REQUEST. The RRC CONNECTION REQUEST includes an RRC establishment cause based upon the attach type of the attach request.

Another embodiment is a method for initiating an Internet protocol (IP) multimedia subsystem (IMS) emergency call using a user equipment (UE). The UE includes a plurality of protocol layers. The plurality of protocol layers include an IMS sublayer, a non-access stratum (NAS) layer and an access stratum (AS) layer. The method includes generating an ATTACH REQUEST using the UE. The ATTACH REQUEST has an attach type. The method includes retrieving the attach type of the ATTACH REQUEST using the NAS layer of the UE, and, when the attach type is a first value, generating an RRC CONNECTION REQUEST. The RRC CONNECTION REQUEST includes an RRC establishment cause having a second value.

Another embodiment is a method for initiating an Internet protocol (IP) multimedia subsystem (IMS) emergency call using a user equipment (UE). The UE includes a plurality of protocol layers. The plurality of protocol layers include an IMS sublayer, a non-access stratum (NAS) layer and an access stratum (AS) layer. The method includes generating a PDN CONNECTIVITY REQUEST using the UE, the PDN CONNECTIVITY REQUEST having a request type, retrieving the request type of the PDN CONNECTIVITY REQUEST, and, when the request type is a first value, generating an RRC CONNECTION REQUEST, the RRC CONNECTION REQUEST including an RRC establishment cause having a second value.

Another embodiment is a method for initiating an Internet protocol (IP) multimedia subsystem (IMS) emergency call using a user equipment (UE). The UE includes a plurality of protocol layers. The plurality of protocol layers include an IMS sublayer, a non-access stratum (NAS) layer and an access stratum (AS) layer. The method includes generating a Call Type using the UE, the Call Type having a first value, generating an RRC CONNECTION REQUEST using the NAS layer of the UE, the RRC CONNECTION REQUEST including an RRC establishment cause having a second value, using the NAS layer of the UE to provide the Call Type when requesting a RRC connection to the AS layer of the UE, and using the AS layer of the UE to transmit the Call Type and the RRC CONNECTION REQUEST to a base station.

Other embodiments include a method for initiating an Internet protocol (IP) multimedia subsystem (IMS) emergency call using a user equipment (UE). The UE including a plurality of protocol layers. The plurality of protocol layers include an IMS sublayer, a non-access stratum (NAS) layer and an access stratum (AS) layer. The method includes generating a PDN CONNECTIVITY REQUEST to the NAS layer of the UE, the PDN CONNECTIVITY REQUEST including an access point name (APN), retrieving the APN of the PDN CONNECTIVITY REQUEST, and, when the APN identifies an emergency APN, generating an RRC CONNECTION REQUEST, the RRC CONNECTION REQUEST including an RRC establishment cause having a second value.

Other embodiments include a base station providing radio resources to a User Equipment (UE) for initiating an Internet protocol (IP) multimedia subsystem (IMS) emergency call. The base station includes a plurality of protocol layers. The plurality of protocol layers include an access stratum (AS) layer. The base station includes a processor configured to receive a Call Type from the AS layer of the UE, the Call Type having a first value, and receive an RRC CONNECTION REQUEST from the AS layer of the UE, the RRC CONNECTION REQUEST including an RRC establishment cause having a second value.

Other embodiments include a base station providing radio resources to a User Equipment (UE) for initiating an Internet protocol (IP) multimedia subsystem (IMS) emergency call. The base station includes a plurality of protocol layers. The plurality of protocol layers include an access stratum (AS) layer. The base station includes a processor configured to receive an RRC CONNECTION REQUEST, and when the RRC CONNECTION REQUEST includes an RRC establishment cause having a value of at least one of EPS emergency call or session, PS emergency, IMS emergency call or session, emergency services, and emergency call, provide necessary radio resources in support of an IMS emergency call to the UE.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects and novel features of the invention will become apparent from the following detailed description of the invention when considered in conjunction with the drawings.

The various aspects of the subject invention are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

In a mobile communications network, the network layer signaling and protocol controllers of the UE and the CN communicate with one another through communications links established by the underlying radio access network controllers. In UMTS and 3GPP terminologies, for example, the network layer between the UE and the CN is termed the NAS. The radio access layer of the radio access network (RAN) is termed the AS.

Because the underlying layers provide services to the upper layers, in the case of UMTS and 3GPP technologies, for example, the AS provides services to the NAS. One such service provided by the AS is to establish a signaling connection for the NAS of a UE such that the NAS of the UE can signal and communicate to an NAS of the core network. As such, when the NAS of the UE wishes to transmit a service request to the NAS of the network, the AS may execute an RRC connection establishment procedure to establish an underlying radio connection.

Figure 3A:
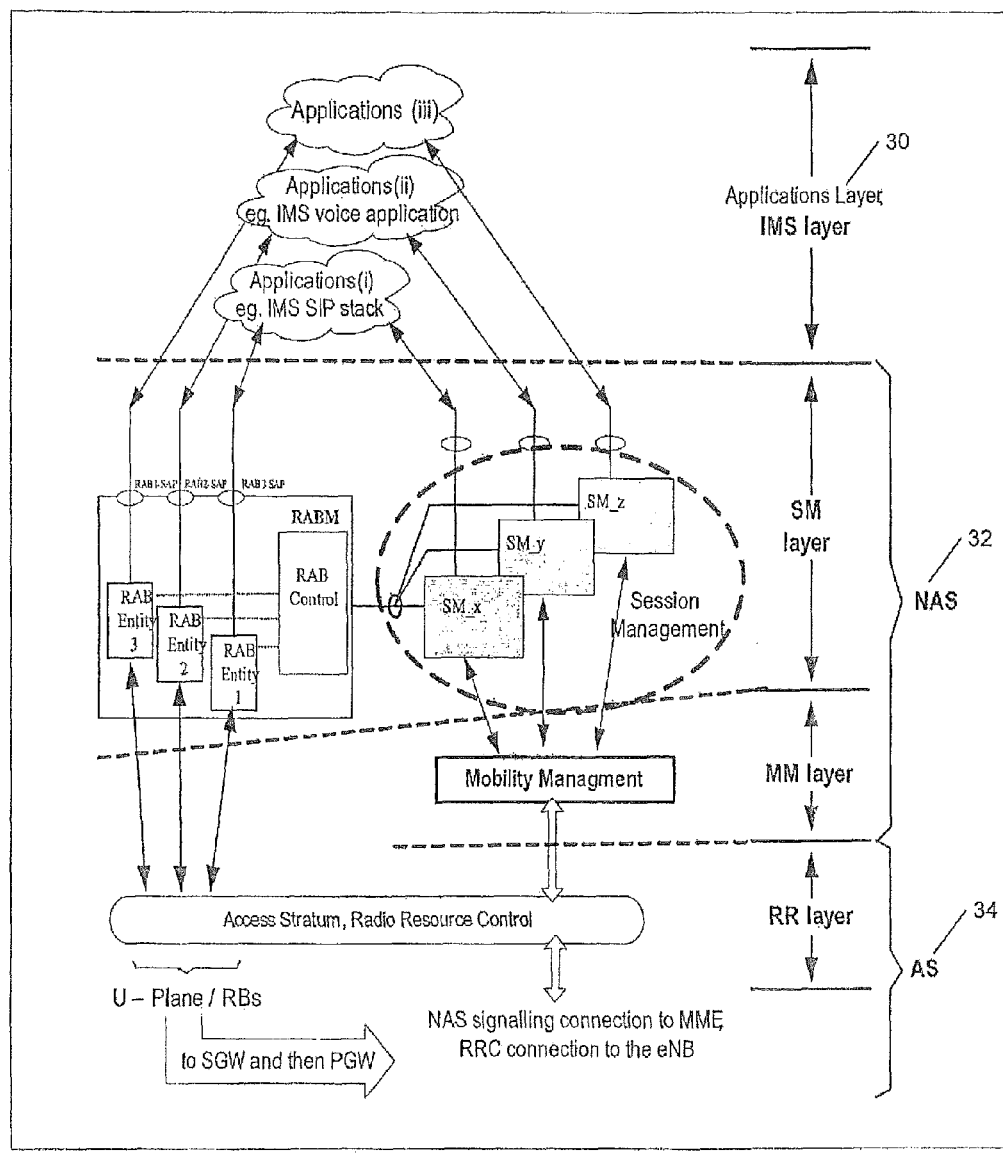
FIG. 3a is an illustration of layering within a UE showing the Internet protocol (IP) multimedia subsystem (IMS) sublayer.
Figure 3B:
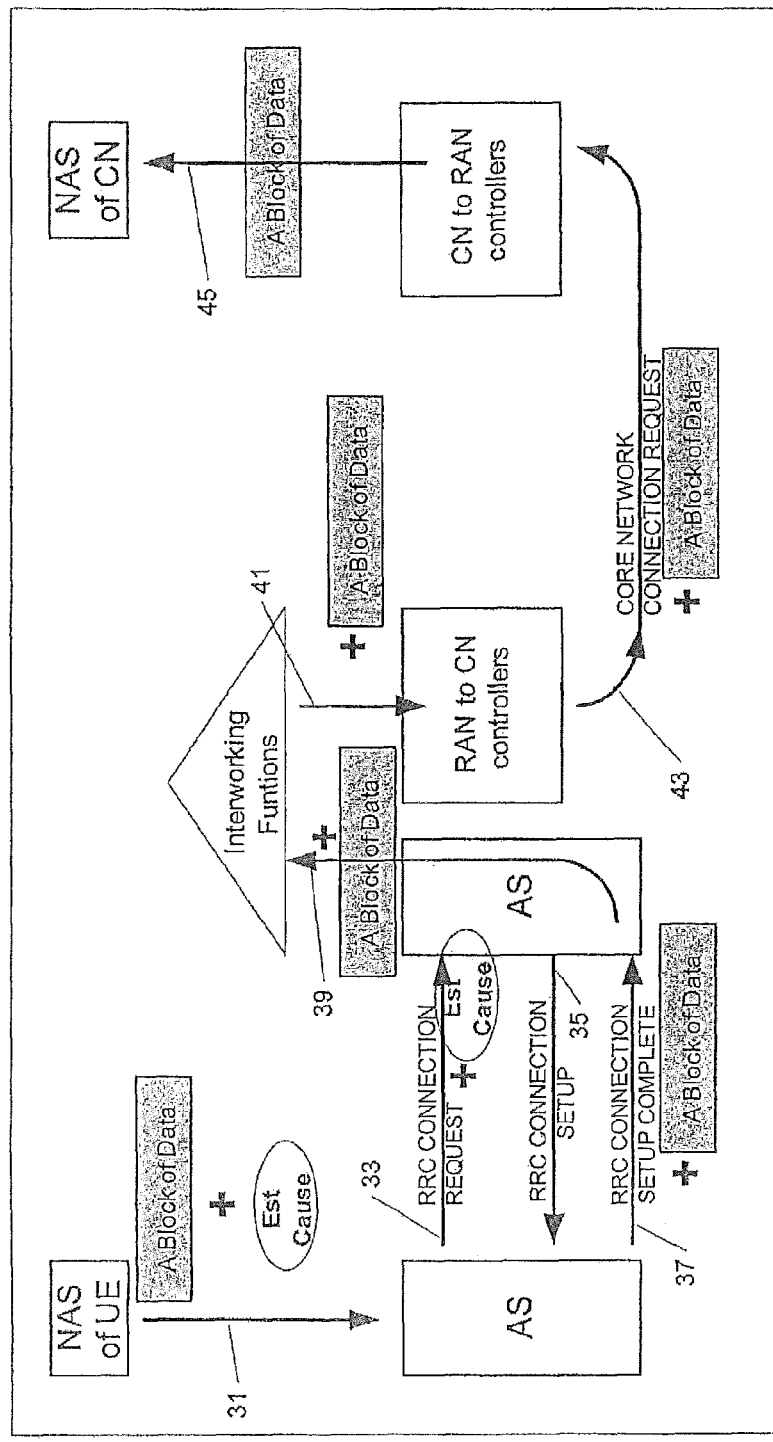
FIG. 3b is an illustration of the process for an non-access stratum (NAS) of a UE to transmit a service request to an NAS of the network.

FIG. 3*b* is an illustration of the process for an NAS of a UE to transmit a service request to an NAS of the network. With reference to FIG. 3*b*, to transfer a service request from an NAS of a UE to an NAS of the network, in step 31 the NAS of the UE first transmits to the AS of the UE a) a block of data and b) an establishment cause. In step 33, the AS of UE starts a RRC connection request procedure that sends an RRC CONNECTION REQUEST to the AS of the RAN. The RRC CONNECTION REQUEST carries with it the establishment cause that was provided by the NAS of the UE. In step 35, the AS of the RAN starts allocating resources for the radio connection and sends an RRC CONNECTION SETUP message to the UE. In step 37, the AS of the UE accepts the radio resource and acknowledges the setup by sending an RRC CONNECTION SETUP COMPLETE message. With the RRC CONNECTION SETUP COMPLETE message, the AS of the UE also passes the block of data received from the NAS of the UE. At this point, the block of data received from the NAS is not inspected by the AS of the UE or the RAN.

In step 39, the AS of the RAN passes the block of data to the interworking function of the RAN and in step 41, the interworking function of the RAN interworks the block of data across to the network side and passes the block of data to the RAN-CN controllers of the RAN. In step 43, the RAN-CN controllers establish a core network connection to the CN and pass the block of data to the CN-RAN controllers of the CN. Finally, in step 45, the CN-RAN controllers receive the block of data and pass the block of data to the NAS of the CN. At this point, the NAS of CN inspects the block of data and identifies a SERVICE REQUEST provided within the block of data. Accordingly, it is only in step 45 that the CN discovers that the UE has sent a SERVICE REQUEST in the original transmission from the NAS of the UE to the AS. To realize other services like CSFB, the SERVICE REQUEST message may be replaced by an EXTENDED SERVICE REQUEST message.

Therefore, during the execution of steps 33, 35, 37, 39, 41, and 43 none of the entities between the NAS of the UE and the NAS of the CN know that the block of data original transmitted by the NAS of the UE is actually a SERVICE REQUEST message. During execution of the process, each component between the NAS of the UE and the NAS of the CN simply pass the block of data amongst one another without inspecting the contents of the block of data. As a result, it is only in step that the CN recognizes that the block of data contains a SERVICE REQUEST.

Accordingly, because the data is not inspected until the end of the process illustrated in FIG. 3*b*, it is difficult for the network to determine that a particular resource is being requested. For example, when initiating an IMS emergency call, the network does not know until the end of the process that a resource is being requested for an IMS emergency call. Specifically, a base station may not be able to determine that an RRC connection request received from a UE will ultimately be used for an IMS emergency call. If the base station cannot determine that the request is for an IMS emergency call, the base station is incapable of quickly establishing the emergency session by, for example, gracefully releasing lesser priority resources if no radio resources are available on the base station. These problems are exacerbated in network configurations implemented using a network sharing configuration wherein a RAN, BTS or base station is effectively shared between two or more core networks or PLMNs. This problem is not limited to emergency calls, but may apply to any service where a resource should receive special handling.

Figure 4:
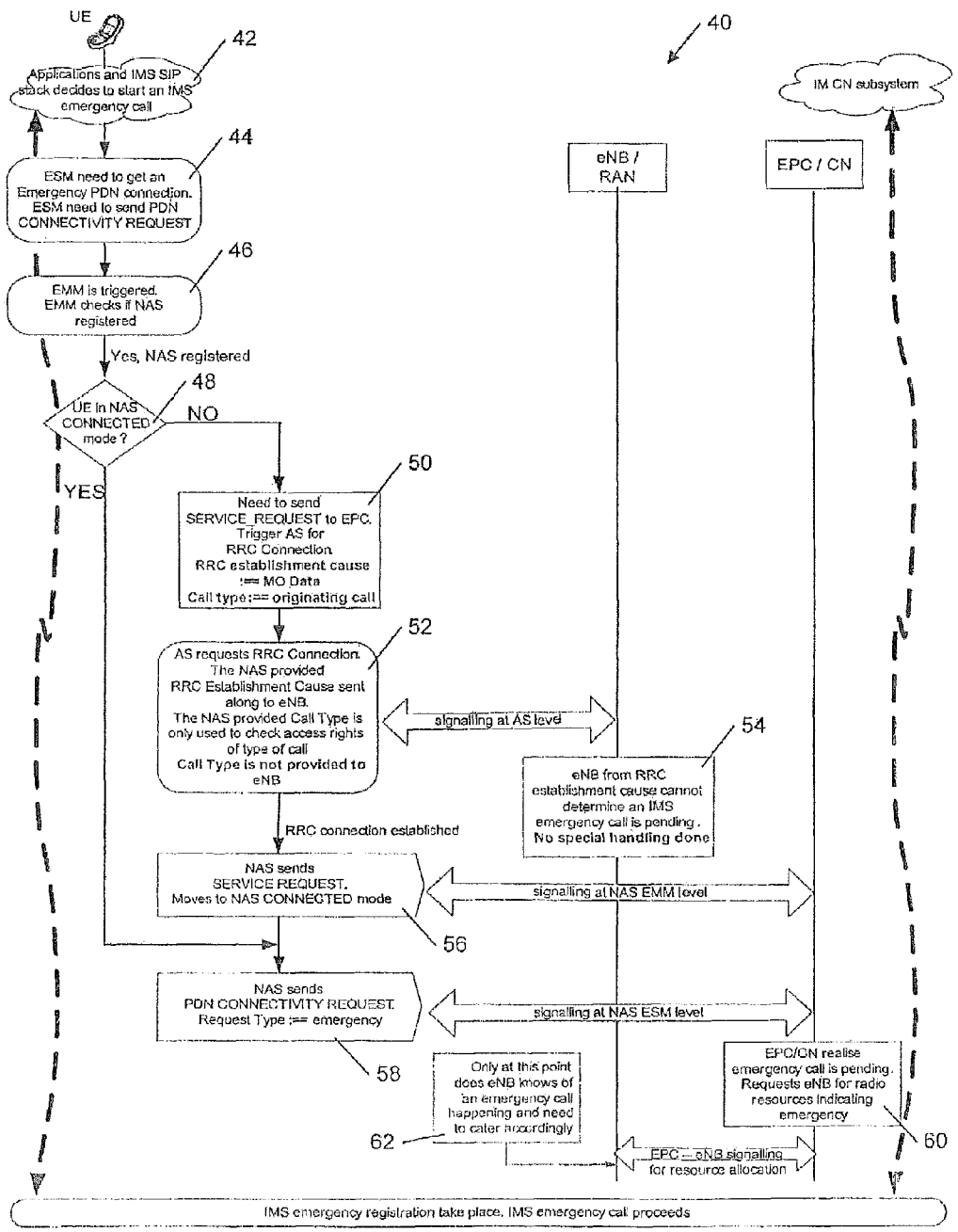
FIG. 4 is a flowchart showing an exemplary process for placing an IMS emergency call using a UE that is NAS registered in NAS IDLE or NAS CONNECTED mode.

FIG. 4 is a flowchart showing an exemplary process 40 for placing an IMS emergency call using a UE that is NAS registered in NAS IDLE or NAS CONNECTED mode. The flowchart shows a process that does not allow the base station to determine whether the process is initiated by a request for an IMS emergency call.

Referring to FIG. 4, in step 42, the applications and IMS stack determine that the user wishes to initiate an IMS emergency call. As such, the IMS layer requests a new EPS session to be used for the IMS emergency call. In step 44, after receiving the request from the IMS layer, the EPS session management (ESM) entity initiates a request for an emergency packet data network (PDN) connection through the NAS of the UE. As such, the ESM issues a PDN CONNECTIVITY REQUEST. In step 46, after issuance of the PDN CONNECTIVITY REQUEST, EPS mobility management (EMM) is triggered and in step 48, the system checks whether the NAS of the UE is registered. If registered, in step 50 the UE sends a SERVICE REQUEST to the EPC to trigger the AS within the UE to establish an RRC connection. In this step, the RRC establishment cause specifies mobile originated (MO) data and the Call Type indicates that there is an originating call. In step 52, the AS of the UE requests the RRC connection. The RRC establishment cause received from the NAS of the UE (e.g., MO data) is passed along to the base station. It is important to note, however, that in this process the Call Type is not provided to the base station—the Call Type is only used by the AS of the UE to verify against the access rights of different types of calls that can be made. As such, and as indicated by box 54, the base station, after inspecting the RRC connection request (without the associated Call Type), cannot determine whether an IMS emergency call is pending. As a result, no special handling will be performed by the base station.

After establishing the RRC connection, the NAS of the UE sends a service request and moves to NAS connected mode in step 56. After entering NAS connected mode, the NAS sends a PDN CONNECTIVITY REQUEST with a request type of "emergency" in step 58. After receiving the PDN CONNECTIVITY REQUEST with a request type of "emergency", the CN recognizes that an emergency call is pending and requests that the base station provide radio resources for initiating the emergency call in step 60. Accordingly, as indicated by box 62, it is only after the CN recognizes that an emergency call is pending and requests that the base station provide necessary radio resources that the base station can become aware that an IMS emergency call is pending.

If, however, in step 48, the system determines that the UE is already in NAS connected mode, the NAS proceeds to send a PDN CONNECTIVITY REQUEST with a request type of "emergency" in step 58 and the same process continues.

Accordingly, when implementing the process illustrated in FIG. 4, the existing RRC establishment causes are insufficient to indicate to the base station that an IMS emergency call is to be placed. Furthermore, in conventional network implementations, the Call Type is not passed to the base station and does not indicate an IMS emergency calls is being placed (e.g., Call Type may only specify a MO call). In fact, in existing implementations, the Call Type may only be used to check access rights for the particular type of call identified by the Call Type. These problems are made worse if the UE is in CONNECTED mode when an IMS emergency call is to be placed because then the NAS may just establish the PDN connection for emergency and the AS will receive no indication that an emergency call is to placed.

Consequently, using the process illustrated in FIG. 4, the base station, even if it inspects the RRC establishment cause, cannot determine that the requested call is an emergency IMS call, or a call that requires special handling. The Call Type is not provided to base station, and the base station will only learn that there is an emergency call after the NAS EMM signaling and NAS ESM signaling when the EPC request allocation of resources. Although at the conclusion of the process the base station may learn that an emergency call is to be placed, by that time the base station may have allocated essential resources to other UEs that may be placing emergency calls using CSFB. A packet based call, such as the IMS emergency call, may be made by a high priority human user (e.g., civil or public service personnel in emergency situations) while the CSFB emergency might be by any ordinary user.

Figure 5:
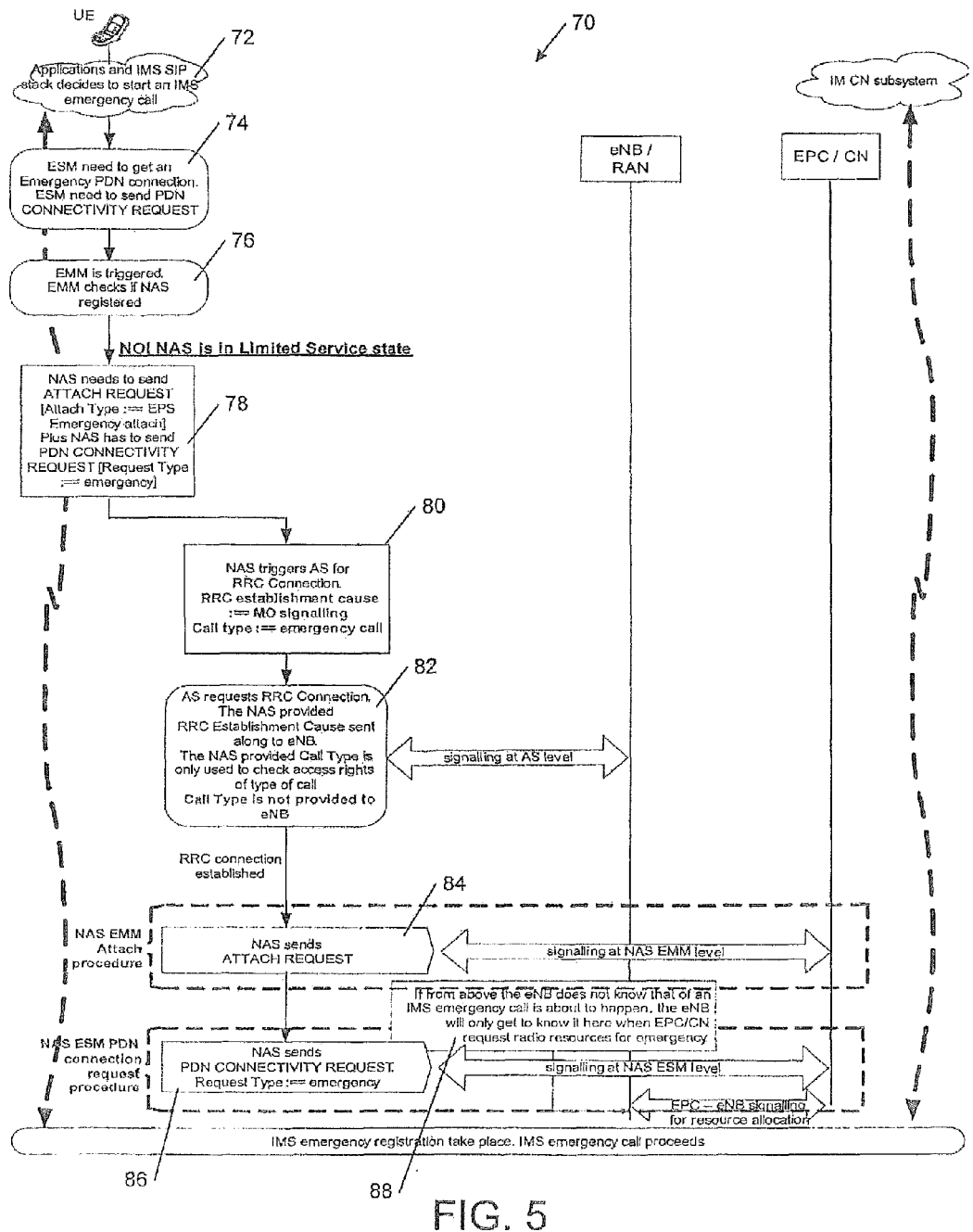
FIG. 5 is a flowchart showing exemplary process for placing an IMS emergency call using a UE that is in a limited service state.

FIG. 5 is a flowchart showing exemplary process 70 for placing an IMS emergency call using a UE that is in a limited service state, as described above. The flowchart shows a process that does not allow the base station to determine whether the process is initiated by a request for an IMS emergency call.

Referring to FIG. 5, in step 72, the applications and IMS stack of a UE in a limited service state determine that the user wishes to initiate an IMS emergency call. As such, the IMS layer requests a new EPS session to be used for the IMS emergency call. In step 74, after receiving the request from the IMS layer, the ESM initiates a request for an emergency PDN connection through the NAS of the UE. As such, the ESM issues a PDN CONNECTIVITY REQUEST. In step 76, after issuance of the PDN CONNECTIVITY REQUEST, EMM is triggered and the system checks whether the NAS of the UE is registered. In this example, because the UE is operating in a limited service state the NAS is not registered. Accordingly, in step 78, the NAS determines that it needs to send an ATTACH REQUEST. In this case, because the UE is initiating an emergency call, the ATTACH REQUEST includes an Attach Type of "EPS emergency attach". In this step, the NAS also sends a PDN CONNECTIVITY REQUEST having a Request Type of "emergency". In step 80 the NAS triggers the AS for an RRC CONNECTION. The RRC establishment cause is set to MO signaling and the Call Type is set to emergency call. In step 82, the AS of the UE requests the RRC connection. The RRC establishment cause received from the NAS of the UE (e.g., MO signaling) is passed along to the base station. It is important to note, however, that in this process the Call Type is not provided to the base station—the Call Type is only used by the AS of the UE to verify against the access rights of different types of calls that are allowed to be made. As such, the base station, after inspecting the RRC connection request (without the associated Call Type), cannot determine whether an IMS emergency call is pending. As a result, no special handling will be performed by the base station.

After establishing the RRC connection, the NAS of the UE sends the ATTACH REQUEST in step 84. After entering NAS connected mode, the NAS sends a PDN CONNECTIVITY REQUEST with a request type of "emergency" in step 86. After receiving the PDN CONNECTIVITY REQUEST with a request type of "emergency", the CN recognizes that an emergency call is pending and requests that the base station provide radio resources for initiating the emergency call. Accordingly, as indicated by box 88, it is only after the CN recognizes that an emergency call is pending and requests that the base station provide necessary radio resources that the base station can become aware that an IMS emergency call is pending.

In an LTE/SAE system, the system may allow for execution of steps 84 and 86 in a concatenated manner. As such, conceptually, steps 84 and step 86 may be executed as one but may be, logically, two steps. This conceptual execution of steps 84 and 86 in a concatenated manner does not change the identified problem.

Figure 6:
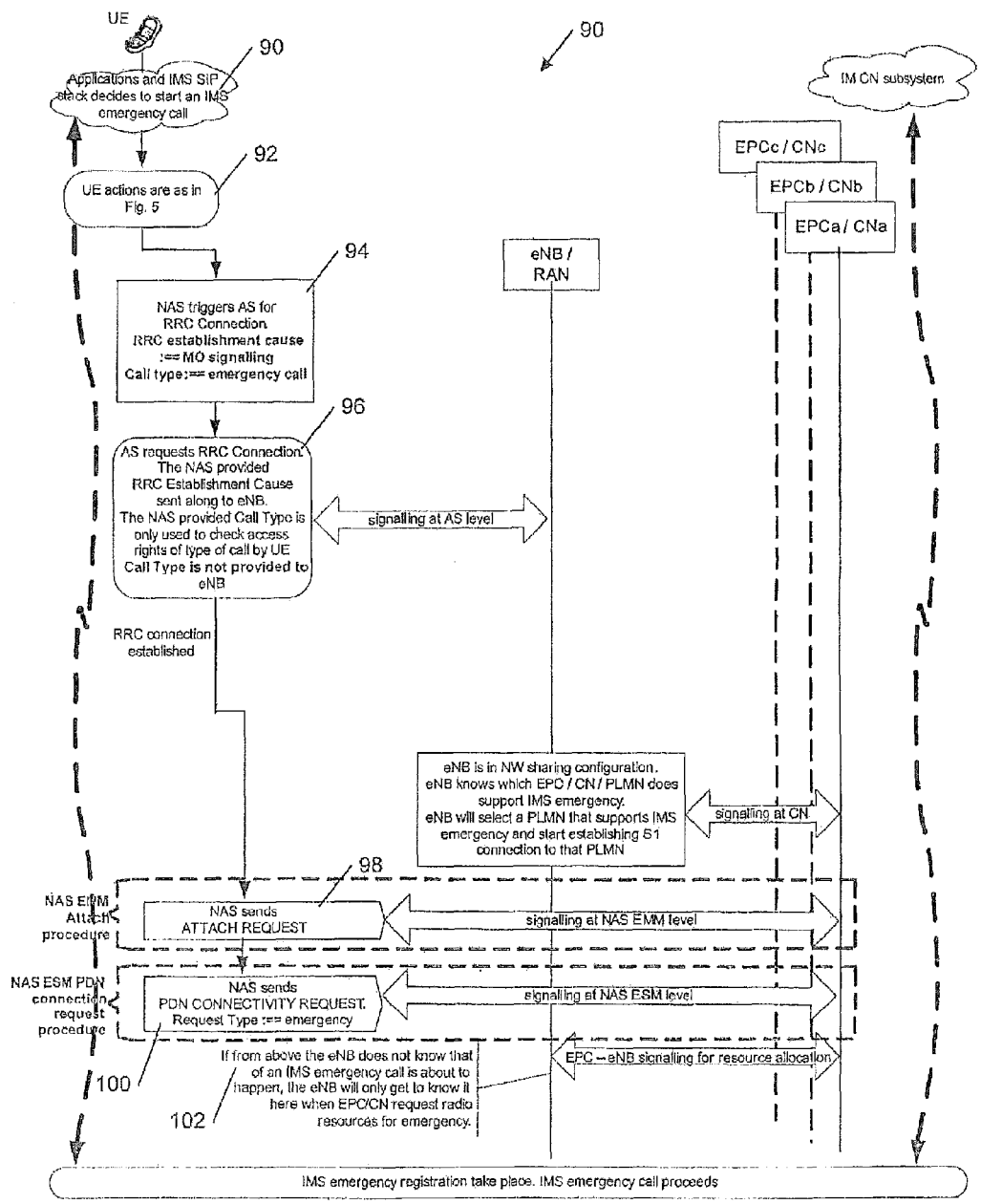
FIG. 6 is a flowchart showing exemplary process for placing an IMS emergency call using a UE that is in a limited service state wherein the network is operating in a network sharing configuration.

FIG. 6 is a flowchart showing exemplary process 90 for placing an IMS emergency call using a UE that is in a limited service state wherein the network is operating in a network sharing configuration. In a network sharing configuration, a RAN, BTS or base station is effectively shared between two or more core networks or PLMNs. Accordingly, FIG. 6 shows a UE that may be in communication with at least one of EPCa, EPCb, and EPCc. The flowchart shows a process that does not allow the base station to determine whether the process is initiated by a request for an IMS emergency call.

Referring to FIG. 6, in step 92, the applications and IMS stack determine that the user wishes to initiate an IMS emergency call. As such, the IMS layer requests a new EPS session to be used for the IMS emergency call. Block 92 may be implemented in accordance with steps 74, 76, and 78 of FIG. 5. In step 94 the NAS triggers the AS for an RRC CONNECTION. The RRC establishment cause is set to MO signaling and the Call Type is set to emergency call. In step 96, the AS of the UE requests the RRC connection. The RRC establishment cause received from the NAS of the UE (e.g., MO signaling) is passed along to the base station. It is important to note, however, that in this process the Call Type is not provided to the base station—the Call Type is only used by the AS of the UE to verify against the access rights of different types of calls that are allowed to be made. As such, the base station, after inspecting the RRC connection request (without the associated Call Type), cannot determine whether an IMS emergency call is pending. As a result, no special handling will be performed by the base station.

After establishing the RRC connection, the NAS of the UE sends the ATTACH REQUEST in step 98. After entering NAS connected mode, the NAS sends a PDN CONNECTIVITY REQUEST with a request type of "emergency" in step 100. After receiving the PDN CONNECTIVITY REQUEST with a request type of "emergency", the CN recognizes that an emergency call is pending and requests that the base station provide radio resources for initiating the emergency call. Accordingly, as indicated by box 102, it is only after the CN recognizes that an emergency call is pending and requests that the base station provide necessary radio resources that the base station can become aware that an IMS emergency call is pending.

In an LTE/SAE system, the system may allow for execution of steps 98 and 100 in a concatenated manner. As such, conceptually, steps 98 and step 100 are executed as one but may be, logically, two steps. This conceptual execution of steps 98 and 100 in a concatenated manner does not change the identified problem.

As shown in FIG. 6, when the network is implementing network sharing, additional problems arise. In the case of network sharing, not all the PLMNs that the base station is serving have to support IMS emergency calls. However, because the base station knows which PLMN supports IMS emergency calls, the base station may be able to select an appropriate PLMN for an IMS emergency call. To do so, the base station must first detect that the UE is attempting to place an IMS emergency call while in a limited service state and then select onto one of the PLMNs that will support the IMS emergency call. Accordingly, it is important that the base station be able to quickly detect that an IMS emergency call is being placed from a UE in limited service state so that an appropriate PLMN can be chosen.

Accordingly, the systems and processes for initiating an IMS emergency call illustrated in FIGS. 4-6 fail to adequately notify the AS that requested resources are to be used for an IMS emergency call. As a result, the provisioning of the necessary resources may be delayed, or the resources may fail to be provided entirely, with the potential result that, even in circumstances where the necessary resources would otherwise be available, the emergency call may fail. For example, problems may arise when a UE is camping on a network cell and is in an NAS registered state. When the UE is in CONNECTED mode, the information passed between the UE and the CN for setting up the IMS emergency call is not known to the AS. As a result, the base station is unable to detect that an IMS emergency call is being placed until the CN initiates a resource request towards the base station and the resource request indicates that an IMS emergency call is imminent. See, for example, FIG. 4. Similarly, when the UE is in IDLE mode, the AS of the UE receives a request from the NAS of the UE to establish an RRC connection. However, existing RRC establishment causes are not sufficiently precise to indicate to the AS that an IMS emergency call is being placed. These problems apply not only to IMS emergency calls, but any packet based call where delay of provisioning necessary resources can be avoided.

In one embodiment, the present system allows a base station to distinguish calls that are requested in the CS domain (e.g., via CSFB) from those requested in the PS domain, e.g., IMS. As a result, the base station may be configured to provide the necessary services for the PS call to minimize any delay associated with initiating the call and ensuring that any necessary resources are made available. When the UE initiates an attach procedure, the Attach Type is used to determine the RRC establishment cause. Then the UE sends the RRC establishment cause in the RRC Connection Request so that expedited necessary resource provisioning can occur. In one implementation of the present system, when the UE initiates an attach procedure, the Attach Type is set to "EPS emergency attach". The NAS of the UE receives and detects the Attach Type value and is configured to set the RRC establishment cause to one of the following when the Attach Type is "EPS emergency attach": "EPS emergency call or session", "PS emergency", "IMS emergency call or session", "emergency services", or "emergency call". When the base station receives an RRC CONNECTION REQUEST message having an RRC establishment cause set to one of "EPS emergency call or session", "PS emergency", "IMS emergency call or session", "emergency services", or "emergency call" the base station may be configured to recognize that an IMS emergency call is being placed. As a result, the base station can cater to the emergency call by giving the call escalated priority and attempting to ensure that any necessary resources are made available.

Furthermore, in the case of a UE in limited service state and a base station configured to support network sharing, the inability of the base station to determine that the UE is in limited service state making an emergency call can lead to that call request being distributed to a core network of the shared network configuration that may not be able to support an IMS emergency call.

Accordingly, the present system uses the Attach Type value specified during the attach procedure to determine or map to the RRC establishment cause. When the Attach Type is set to "EPS emergency attach", for example, the RRC establishment cause is consequently set to "EPS emergency call or session", "PS emergency", "emergency call", or another appropriate value.

Prior systems allow for an RRC establishment cause indicating "emergency call". Although that configuration allows a base station to determine that an emergency call is being placed, it does not allow the base station to distinguish between a PS call, such as an IMS emergency call, and a CSFB emergency call.

As an alternative, additional RRC establishment cases values of "EPS emergency call or session", "PS emergency", "IMS emergency call or session", or "emergency services" may be introduced and used to indicate that a PS call, such as an IMS emergency call, is being setup. In this embodiment, alternative appropriately named RRC establishment causes may be used to distinguish the emergency call as a PS call, such as an IMS emergency call, rather than a CSFB emergency call.

In another implementation, the Request Type may be used to determine the RRC establishment cause. For example, when the UE needs to initiate a PDN CONNECTIVITY REQUEST to get an emergency PDN the UE may be configured to set the Request Type to "emergency". The Request Type of "emergency" may then be used to map or determine the RRC Establishment cause by, for example, causing the RRC establishment cause value to be set to "EPS emergency call or session", "PS emergency call", "IMS emergency call or session", "emergency services", "emergency call", or some other appropriately named cause. In this implementation, when the base station receives an RRC CONNECTION REQUEST message having an RRC establishment cause set to "EPS emergency call or session", "PS emergency", "IMS emergency call or session", "emergency services", or "emergency call" the base station may be configured to detect that an IMS emergency call is being placed and can attempt to provide any necessary resources. If the RRC establishment cause were only to be set to "emergency call", the base station, even though it may know an emergency call will happen, cannot distinguish a PS call, such as an IMS emergency call, from a CSFB emergency call As such, in a further embodiment, the Request Type value is used to determine or map to a particular RRC establishment cause. For example, when the Request Type="emergency", the RRC establishment cause is set to "EPS emergency call or session", "PS emergency", "IMS emergency call or session", "emergency services", or some other appropriate value distinct from "emergency call".

In some implementations of the present system, when the UE initiates the Service Request procedure that triggers the request for the RRC connection, the RRC establishment cause may be mapped from (or determined by) the Request Type of the procedure that the RRC connection is intended for (e.g., the Request Type may be set in the PDN CONNECTIVITY REQUEST). In other words, the RRC establishment cause may be determined by the ultimate use of the RRC connection and by the procedure triggering for the RRC connection (ie. the Service Request procedure). This setting of the RRC establishment cause may be realized using the Request Type of the PDN CONNECTIVITY REQUEST which points to the ultimate use of the RRC connection.

In another implementation of the present system, the Call Type may be provided to the RAN/base station (e.g., an eNB). For example, with reference to FIG. 4, instead of only using the Call Type to verify against the access rights of different types of calls that are allowed be made, the Call Type value that is passed from the NAS to the AS is as part of or in addition to the RRC connection request be communicated to the base station.

In this implementation, only setting a Call Type of "emergency call" to the Attach procedure for EPS emergency services, may be insufficient as additional NAS procedures that are run to support IMS emergency calls must likewise have the Call Type set to "emergency calls". For example, the procedures may include a PDN connection request to an emergency access point name (APN), a Service Request procedure that carries a PDN connection to an emergency APN, and a Tracking Area Update procedure that might be used to trigger EPC awareness of the UE but subsequently the UE will place an IMS emergency call.

In this implementation, when the base station receives the RRC CONNECTION REQUEST with a Call Type set to emergency call, the base station may be configured to recognize an emergency call will be placed and can cater for needed resources. If, however, the Call Type is only set to "emergency calls", the base station may be unable to distinguish between CSFB emergency calls or PS calls, such as IMS emergency calls.

In this case, the Call Type may be transmitted to the base station as a new information element (IS) or as a new information field within an existing IE. After receiving the Call Type, the base station may be configured to check the Call Type and act accordingly. If Call Type indicates an emergency call is imminent the base station may take appropriate actions including reserving radio resources.

Because the base station cannot distinguish between CSFB emergency calls and PS calls, such as IMS emergency calls, using a single value of Call Type="emergency calls", distinct Call Types for CSFB emergency calls and PS emergency calls, such as IMS emergency calls, may be defined. For example, if an PS emergency call, e.g., IMS emergency call, is to be placed, the Call Type can be "EPS emergency call or session", "PS emergency", "IMS emergency call or session", "emergency services" or some other appropriately named Call Type. The current Call Type of "emergency calls" can then be left for CSFB emergency calls or may be renamed to "CSFB emergency call" or some other appropriately but distinctively named Call Type. Call type can indicate the intended services and thus the base station can provide the appropriate resources. Call type may be expanded for data services, and could indicate to a base station that a large amount of bandwidth may be needed for a streaming data service. Call type considered with a user's priority level may also be used to determine that adequate bandwidth by allocated by the base station.

In other implementations of the present system, the APN of the PDN CONNECTIVITY REQUEST may be used to map to the RRC establishment cause. If the APN of the PDN CONNECTIVITY REQUEST is an Emergency APN, the NAS may be configured to set the RRC establishment cause to "EPS emergency call or session", "PS emergency call", "IMS emergency call or session", "emergency services", "emergency call", or some other appropriately named cause. In this implementation, the UE knows whether an APN is an emergency APN from configuration data that may be stored within the UE, retrieved from SIM data, or otherwise provided to the UE by the operator through any appropriate provisioning method. Note that the use of APN to map values from one layer to another (e.g., from the NAS to the AS) may be incorporated into and supplement or replace other mapping methodologies as described above.

Figure 7:
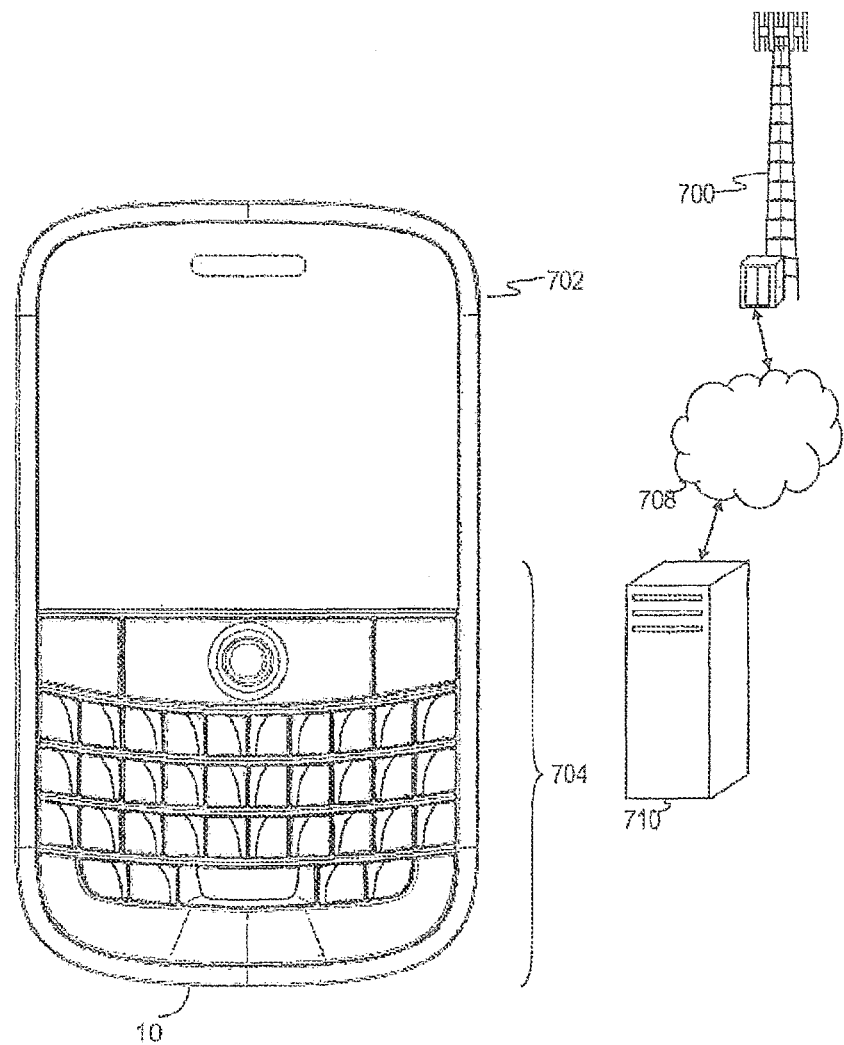
FIG. 7 is a diagram of a wireless communications system including a UE operable for some of the various embodiments of the disclosure.

FIG. 7 illustrates a wireless communications system including an embodiment of UA 10. UA 10 is operable for implementing aspects of the disclosure, but the disclosure should not be limited to these implementations. Though illustrated as a mobile phone, the UA 10 may take various forms including a wireless handset, a pager, a personal digital assistant (PDA), a portable computer, a tablet computer, a laptop computer. Many suitable devices combine some or all of these functions. In some embodiments of the disclosure, the UA is not a general purpose computing device like a portable, laptop or tablet computer, but rather is a special-purpose communications device such as a mobile phone, a wireless handset, a pager, a PDA, or a telecommunications device installed in a vehicle. The UA 10 may also be a device, include a device, or be included in a device that has similar capabilities but that is not transportable, such as a desktop computer, a set-top box, or a network node. The UA 10 may support specialized activities such as gaming, inventory control, job control, and/or task management functions, and so on.

The UA 10 includes a display 702. The UA 10 also includes a touch-sensitive surface, a keyboard or other input keys generally referred as 704 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UA 10 may present options for the user to select, controls for the user to actuate, and/or cursors or other indicators for the user to direct.

The UA 10 may further accept data entry from the user, including numbers to dial or various parameter values for configuring the operation of the UA 10. The UA 10 may further execute one or more software or firmware applications in response to user commands. These applications may configure the UA 10 to perform various customized functions in response to user interaction. Additionally, the UA 10 may be programmed and/or configured over-the-air, for example from a wireless base station, a wireless access point, or a peer UA 10.

Among the various applications executable by the UA 10 are a web browser, which enables the display 702 to show a web page. The web page may be obtained via wireless communications with a wireless network access node, a cell tower, a peer UA 10, or any other wireless communication network or system 700. The network 700 is coupled to a wired network 708, such as the Internet. Via the wireless link and the wired network, the UA has access to information on various servers, such as a server 710. The server 710 may provide content that may be shown on the display 702. Alternately, the UA 10 may access the network 700 through a peer UA 10 acting as an intermediary, in a relay type or hop type of connection.

Figure 8:
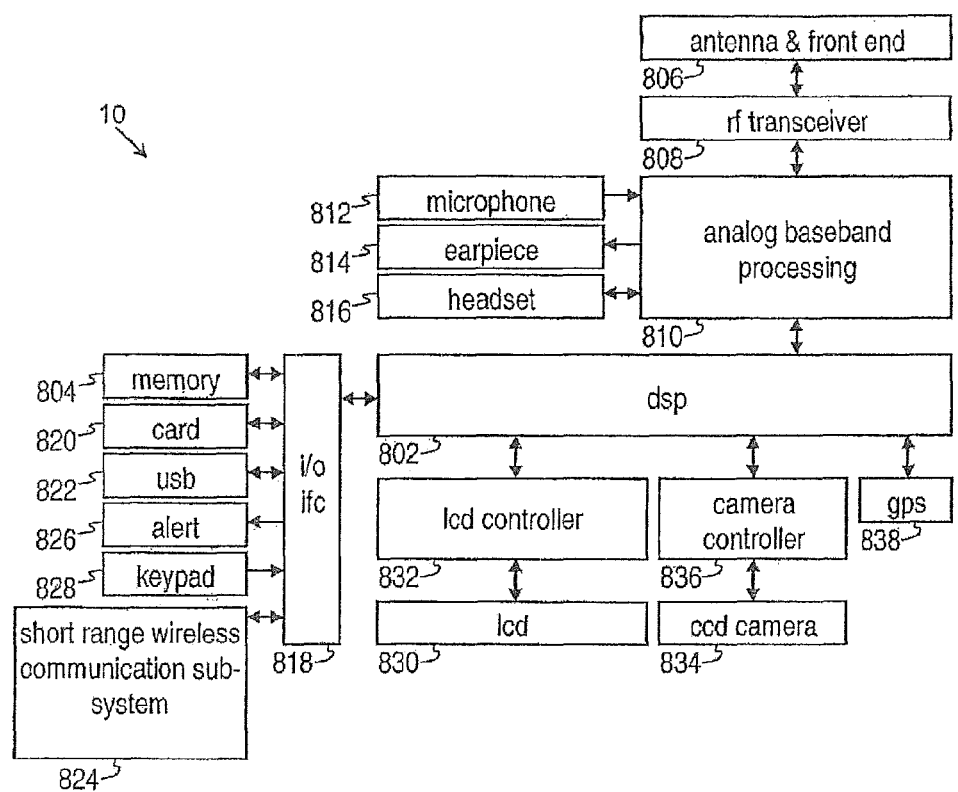
FIG. 8 is a block diagram of a UE operable for some of the various embodiments of the disclosure.

FIG. 8 shows a block diagram of the UA 10. While a variety of known components of UAs 10 are depicted, in an embodiment a subset of the listed components and/or additional components not listed may be included in the UA 10. The UA 10 includes a digital signal processor (DSP) 802 and a memory 804. As shown, the UA 10 may further include an antenna and front end unit 806, a radio frequency (RF) transceiver 808, an analog baseband processing unit 810, a microphone 812, an earpiece speaker 814, a headset port 816, an input/output interface 818, a removable memory card 820, a universal serial bus (USB) port 822, a short range wireless communication sub-system 824, an alert 826, a keypad 828, a liquid crystal display (LCD), which may include a touch sensitive surface 830, an LCD controller 832, a charge-coupled device (CCD) camera 834, a camera controller 836, and a global positioning system (GPS) sensor 838. In an embodiment, the UA 10 may include another kind of display that does not provide a touch sensitive screen. In an embodiment, the DSP 802 may communicate directly with the memory 804 without passing through the input/output interface 818.

The DSP 802 or some other form of controller or central processing unit operates to control the various components of the UA 10 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The antenna and front end unit 806 may be provided to convert between wireless signals and electrical signals, enabling the UA 10 to send and receive information from a cellular network or some other available wireless communications network or from a peer UA 10. In an embodiment, the antenna and front end unit 806 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 806 may include antenna tuning and/or impedance matching components, RF power amplifiers, and/or low noise amplifiers.

The RF transceiver 808 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 810 and/or the DSP 802 or other central processing unit. In some embodiments, the RF Transceiver 808, portions of the Antenna and Front End 806, and the analog base band processing unit 810 may be combined in one or more processing units and/or application specific integrated circuits (ASICs).

The analog baseband processing unit 810 may provide various analog processing of inputs and outputs, for example analog processing of inputs from the microphone 812 and the headset 816 and outputs to the earpiece 814 and the headset 816. To that end, the analog baseband processing unit 810 may have ports for connecting to the built-in microphone 812 and the earpiece speaker 814 that enable the UA 10 to be used as a cell phone. The analog baseband processing unit 810 may further include a port for connecting to a headset or other hands-free microphone and speaker configuration. The analog baseband processing unit 810 may provide digital-to-analog conversion in one signal direction and analog-to-digital conversion in the opposing signal direction. In some embodiments, at least some of the functionality of the analog baseband processing unit 810 may be provided by digital processing components, for example by the DSP 802 or by other central processing units.

The DSP 802 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 802 may perform modulation, coding, interleaving, and spreading, and for a receiver function the DSP 802 may perform despreading, deinterleaving, decoding, and demodulation. In another embodiment, for example in an orthogonal frequency division multiplex access (OFDMA) technology application, for the transmitter function the DSP 802 may perform modulation, coding, interleaving, inverse fast Fourier transforming, and cyclic prefix appending, and for a receiver function the DSP 802 may perform cyclic prefix removal, fast Fourier transforming, deinterleaving, decoding, and demodulation. In other wireless technology applications, yet other signal processing functions and combinations of signal processing functions may be performed by the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB interface 822 and the short range wireless communication sub-system 824. The USB interface 822 may be used to charge the UA and may also enable the UA 10 to function as a peripheral device to exchange information with a personal computer or other computer system. The short range wireless communication sub-system 824 may include an infrared port, a Bluetooth interface, an IEEE 802.11 compliant wireless interface, or any other short range wireless communication sub-system, which may enable the UA to communicate wirelessly with other nearby mobile devices and/or wireless base stations.

The input/output interface 818 may further connect the DSP 802 to the alert 826 that, when triggered, causes the UA 10 to provide a notice to the user, for example, by ringing, playing a melody, or vibrating. The alert 826 may serve as a mechanism for alerting the user to any of various events such as an incoming call, a new text message, and an appointment reminder by silently vibrating, or by playing a specific pre-assigned melody for a particular caller.

The keypad 828 couples to the DSP 802 via the interface 818 to provide one mechanism for the user to make selections, enter information, and otherwise provide input to the UA 10. The keyboard 828 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 830, which may include touch screen capability and also display text and/or graphics to the user. The LCD controller 832 couples the DSP 802 to the LCD 830.

The CCD camera 834, if equipped, enables the UA 10 to take digital pictures. The DSP 802 communicates with the CCD camera 834 via the camera controller 836. In another embodiment, a camera operating according to a technology other than Charge Coupled Device cameras may be employed. The GPS sensor 838 is coupled to the DSP 802 to decode global positioning system signals, thereby enabling the UA 10 to determine its position. Various other peripherals may also be included to provide additional functions, e.g., radio and television reception.

Figure 9:
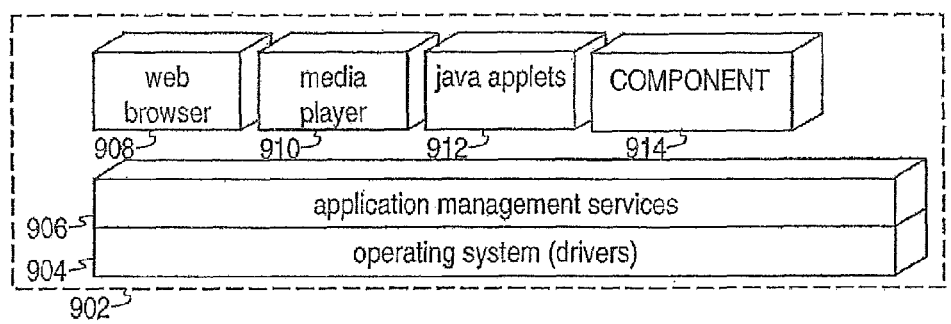
FIG. 9 is a diagram of a software environment that may be implemented on a UE operable for some of the various embodiments of the disclosure.

FIG. 9 illustrates a software environment 902 that may be implemented by the DSP 802. The DSP 802 executes operating system drivers 904 that provide a platform from which the rest of the software operates. The operating system drivers 904 provide drivers for the UA hardware with standardized interfaces that are accessible to application software. The operating system drivers 904 include application management services (AMS) 906 that transfer control between applications running on the UA 10. Also shown in FIG. 9 are a web browser application 908, a media player application 910, and Java applets 912. The web browser application 908 configures the UA 10 to operate as a web browser, allowing a user to enter information into forms and select links to retrieve and view web pages. The media player application 910 configures the UA 10 to retrieve and play audio or audiovisual media. The Java applets 912 configure the UA 10 to provide games, utilities, and other functionality. A component 914 might provide functionality described herein.

Figure 10:
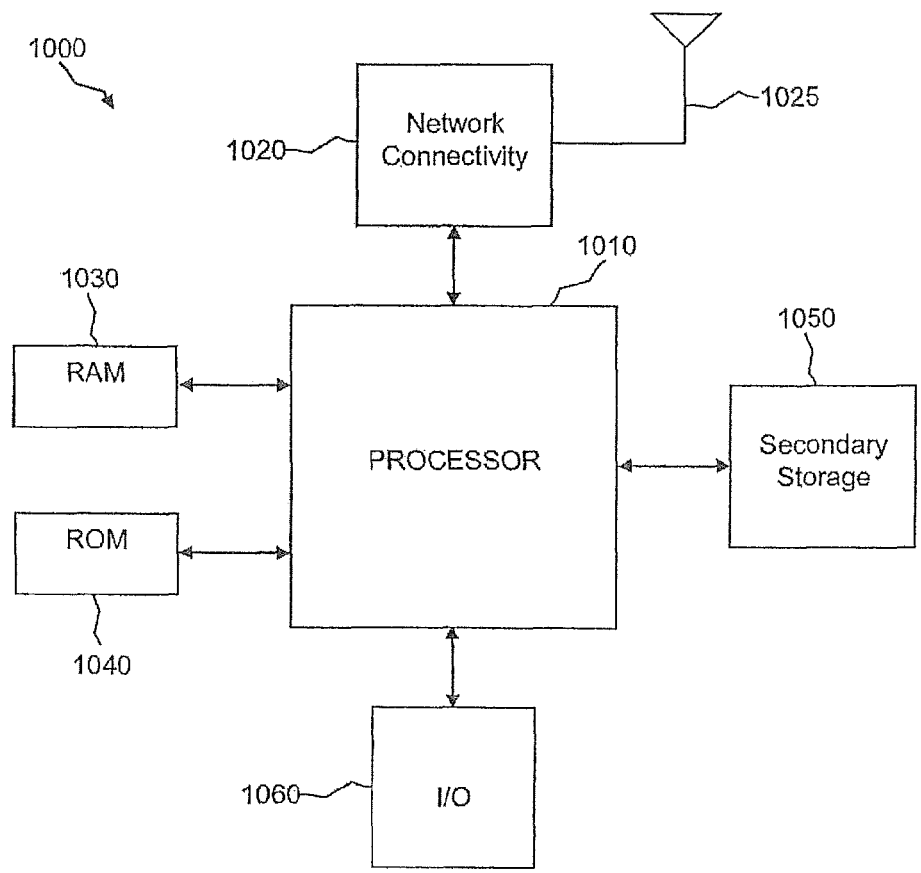
FIG. 10 is an illustrative general purpose computer system suitable for some of the various embodiments of the disclosure.

The UA 10, base station 120, and other components described above might include a processing component that is capable of executing instructions related to the actions described above. FIG. 10 illustrates an example of a system 1000 that includes a processing component 1010 suitable for implementing one or more embodiments disclosed herein. In addition to the processor 1010 (which may be referred to as a central processor unit (CPU or DSP), the system 1000 might include network connectivity devices 1020, random access memory (RAM) 1030, read only memory (ROM) 1040, secondary storage 1050, and input/output (I/O) devices 1060. In some cases, some of these components may not be present or may be combined in various combinations with one another or with other components not shown. These components might be located in a single physical entity or in more than one physical entity. Any actions described herein as being taken by the processor 1010 might be taken by the processor 1010 alone or by the processor 1010 in conjunction with one or more components shown or not shown in the drawing.

The processor 1010 executes instructions, codes, computer programs, or scripts that it might access from the network connectivity devices 1020, RAM 1030, ROM 1040, or secondary storage 1050 (which might include various disk-based systems such as hard disk, floppy disk, or optical disk). While only one processor 1010 is shown, multiple processors may be present. Thus, while instructions may be discussed as being executed by a processor, the instructions may be executed simultaneously, serially, or otherwise by one or multiple processors. The processor 1010 may be implemented as one or more CPU chips.

The network connectivity devices 1020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA)

devices, global system for mobile communications (GSM) radio transceiver devices, worldwide interoperability for microwave access (WiMAX) devices, and/or other well-known devices for connecting to networks. These network connectivity devices 1020 may enable the processor 1010 to communicate with the Internet or one or more telecommunications networks or other networks from which the processor 1010 might receive information or to which the processor 1010 might output information.

The network connectivity devices 1020 might also include one or more transceiver components 1025 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1025 might include separate receiving and transmitting units or a single transceiver. Information transmitted or received by the transceiver 1025 may include data that has been processed by the processor 1010 or instructions that are to be executed by processor 1010. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1030 might be used to store volatile data and perhaps to store instructions that are executed by the processor 1010. The ROM 1040 is a non-volatile memory device that typically has a smaller memory capacity than the memory capacity of the secondary storage 1050. ROM 1040 might be used to store instructions and perhaps data that are read during execution of the instructions. Access to both RAM 1030 and ROM 1040 is typically faster than to secondary storage 1050. The secondary storage 1050 is typically comprised of one or more disk drives or tape drives and might be used for non-volatile storage of data or as an over-flow data storage device if RAM 1030 is not large enough to hold all working data. Secondary storage 1050 may be used to store programs that are loaded into RAM 1030 when such programs are selected for execution.

The I/O devices 1060 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 1025 might be considered to be a component of the I/O devices 1060 instead of or in addition to being a component of the network connectivity devices 1020. Some or all of the I/O devices 1060 may be substantially similar to various components depicted in the previously described drawing of the UA 10, such as the display 702 and the input 704.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made without departing from the spirit and scope disclosed herein.

To apprise the public of the scope of this invention, the following claims are made:

The invention claimed is:

1. A method in a user equipment (UE), the method including:
   generating a non-access stratum (NAS) ATTACH REQUEST message at the UE, the NAS ATTACH REQUEST message having an attach type associated with establishing an emergency call via a packet-switched (PS) network and the attach type indicating that the NAS ATTACH REQUEST message is for EPS emergency attach;
   determining a radio resource control, RRC, establishment cause based upon the attach type in the NAS ATTACH REQUEST message, wherein the RRC establishment cause indicates a NAS layer is requesting the establishment of an RRC connection for the emergency call via the PS network; and
   transmitting an RRC CONNECTION REQUEST message to a radio access network to establish the RRC connection, the RRC CONNECTION REQUEST message including the RRC establishment cause.

2. The method of claim 1, further comprising after transmitting the RRC CONNECTION REQUEST message, transmitting the NAS ATTACH REQUEST message via the RRC connection to a NAS entity.

3. The method of claim 1, wherein the radio access network is an evolved universal terrestrial radio access network (EU-TRAN) and the RRC CONNECTION REQUEST message is transmitted to an evolved node B (eNB) base station.

4. The method of claim 1, wherein the RRC establishment cause is at least one of EPS emergency call or session, PS emergency, IMS emergency call or session, emergency services, and emergency call.

5. A user equipment, UE, comprising:
   a processor configured to generate a non-access stratum, NAS, ATTACH REQUEST message at the UE, the NAS ATTACH REQUEST message having an attach type associated with establishing an emergency call via a packet-switched (PS) network and the attach type indicating that the NAS ATTACH REQUEST message is for EPS emergency attach;
   the processor being further configured to determine a radio resource control, RRC, establishment cause based upon the attach type in the NAS ATTACH REQUEST message, wherein the RRC establishment cause indicates a NAS layer is requesting the establishment of an RRC connection for the emergency call via the PS network; and
   the processor being further configured to transmit an RRC CONNECTION REQUEST message to a radio access network to establish the RRC connection, the RRC CONNECTION REQUEST message including the RRC establishment cause.

6. The UE of claim 5, wherein the RRC establishment cause is at least one of EPS emergency call or session, PS emergency, IMS emergency call or session, emergency services, and emergency call.

7. The UE of claim 5, the processor being further configured to transmit the NAS ATTACH REQUEST message via the RRC connection to a NAS entity after transmitting the RRC CONNECTION REQUEST message.

8. The UE of claim 5, wherein UE transmits the RRC CONNECTION REQUEST message to an evolved node B, eNB, of an evolved universal terrestrial radio access network, EUTRAN.

* * * * *